O. A. WHEELER.
MECHANISM FOR TURNING CUFF PLIES AND THE LIKE.
APPLICATION FILED JULY 19, 1911.

1,050,074.

Patented Jan. 7, 1913.

7 SHEETS—SHEET 1.

Witnesses:
Inventor;
Omar A. Wheeler,
By
Attorney.

O. A. WHEELER.
MECHANISM FOR TURNING CUFF PLIES AND THE LIKE.
APPLICATION FILED JULY 19, 1911.

1,050,074.

Patented Jan. 7, 1913.

7 SHEETS—SHEET 2.

Witnesses;

Inventor;
Omar A. Wheeler,
By
Attorney.

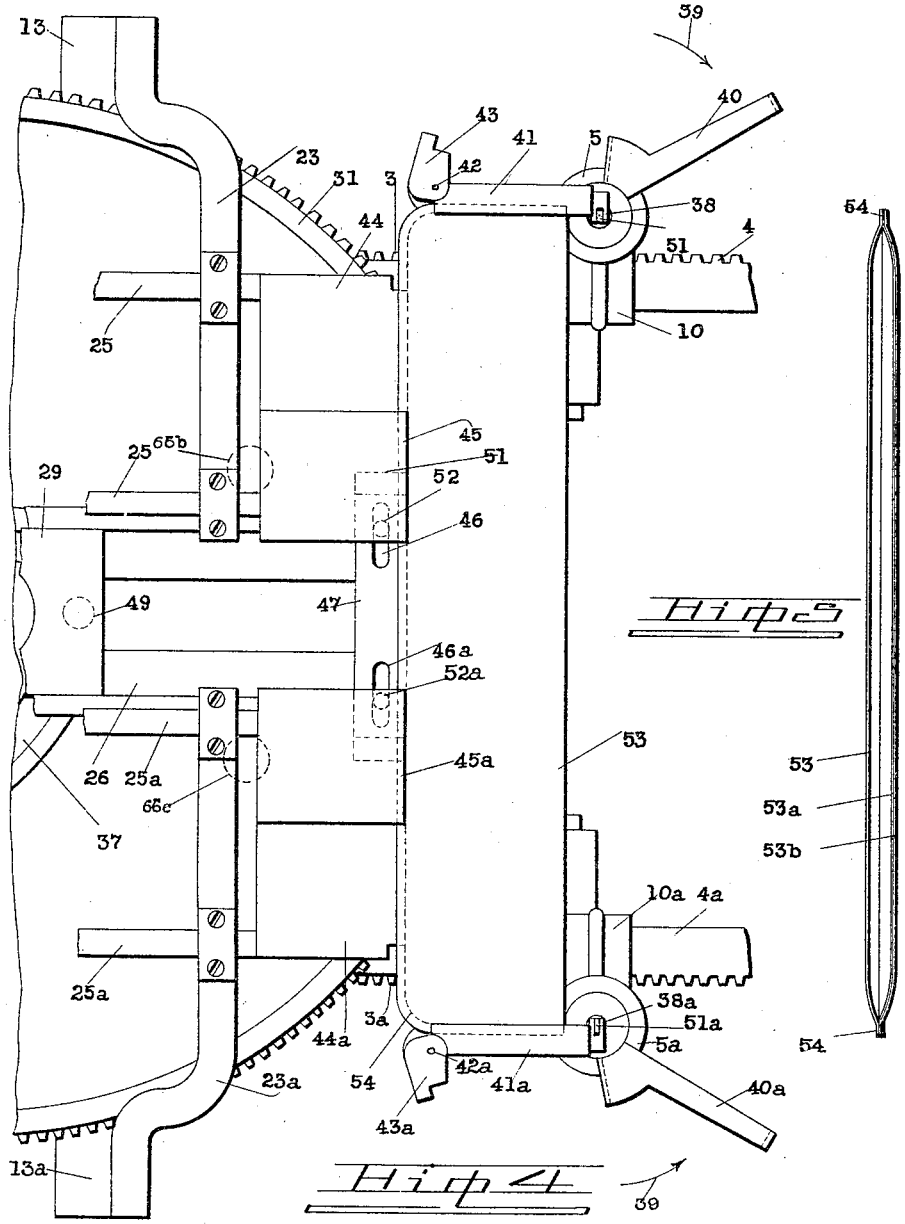

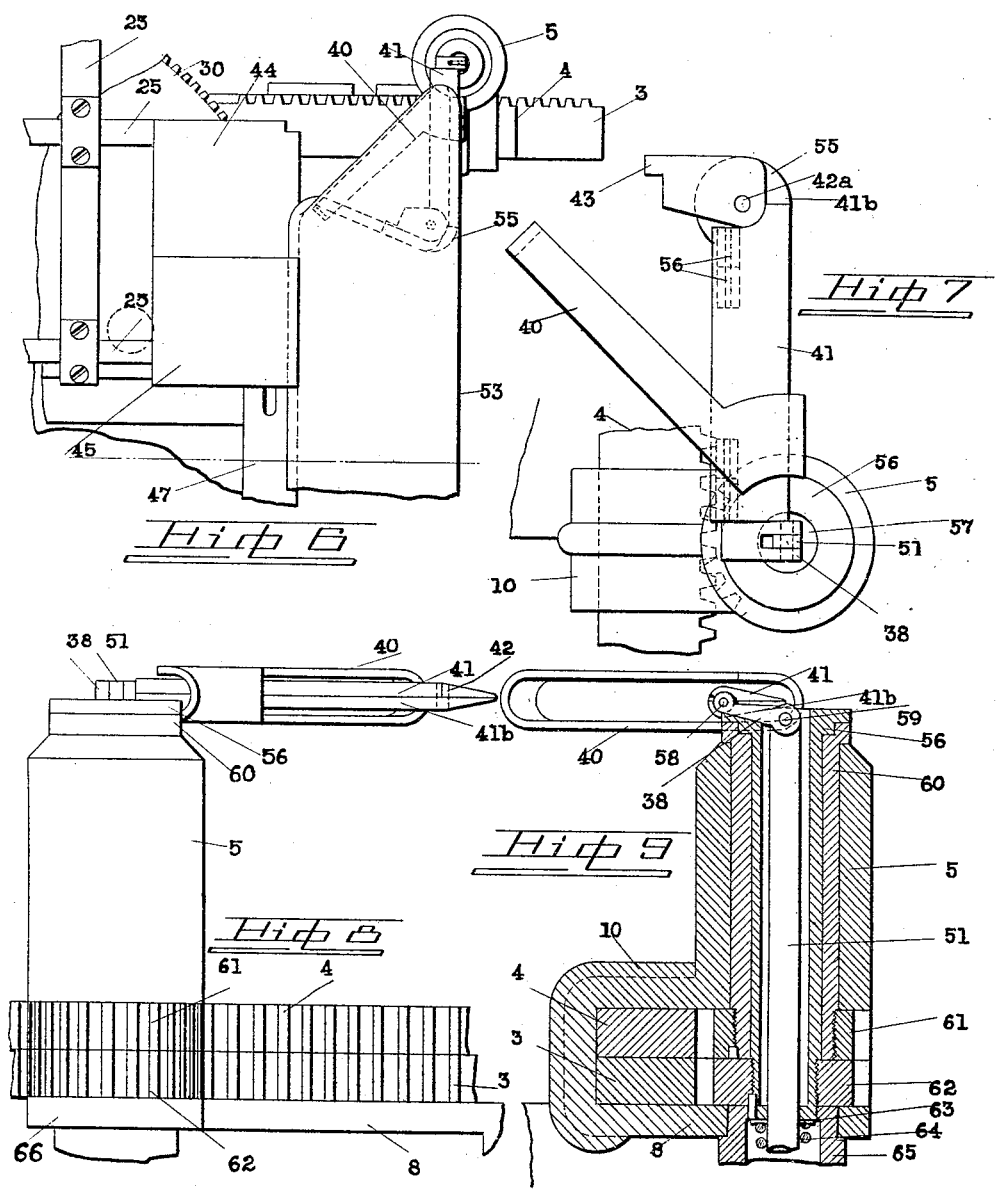

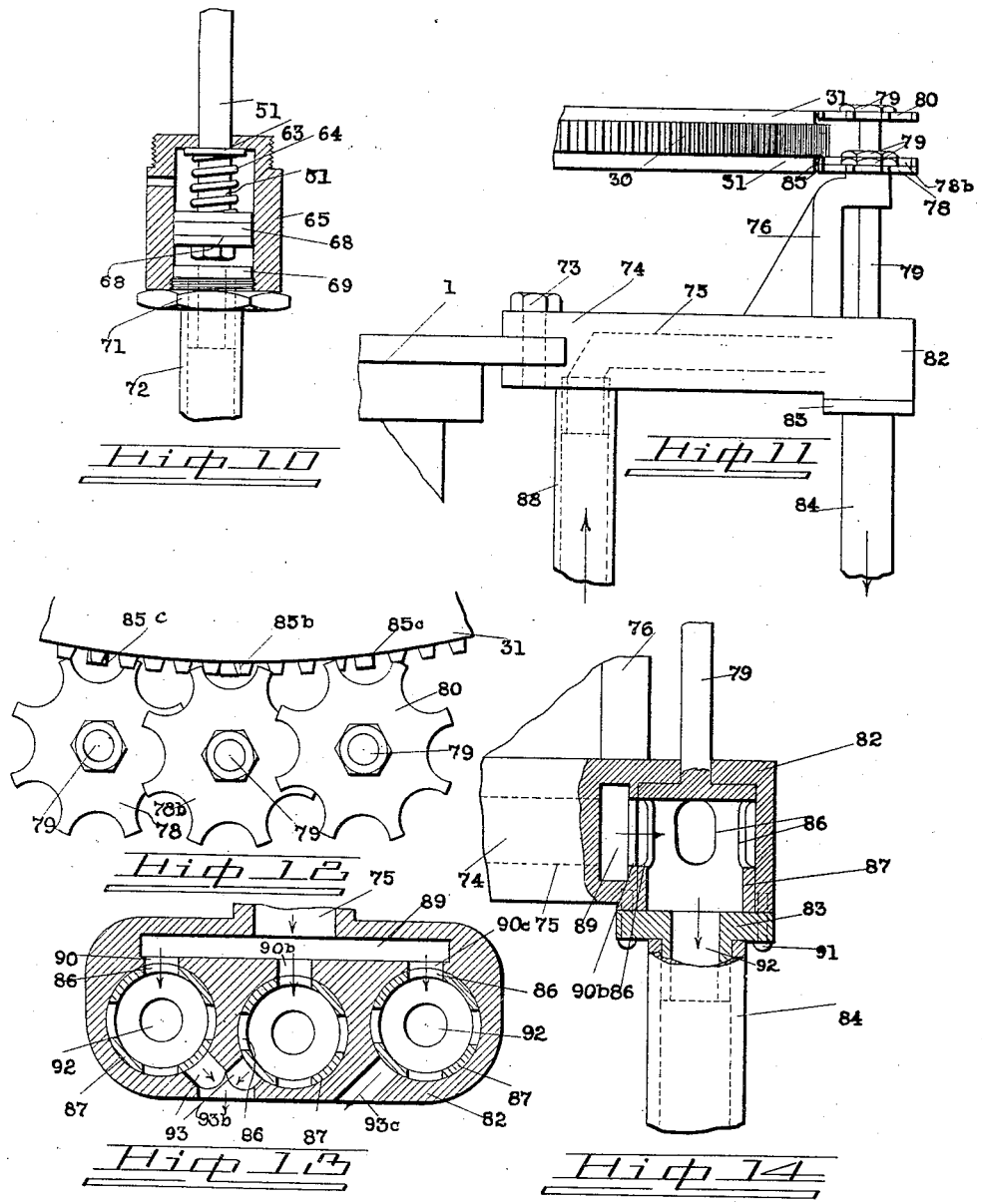

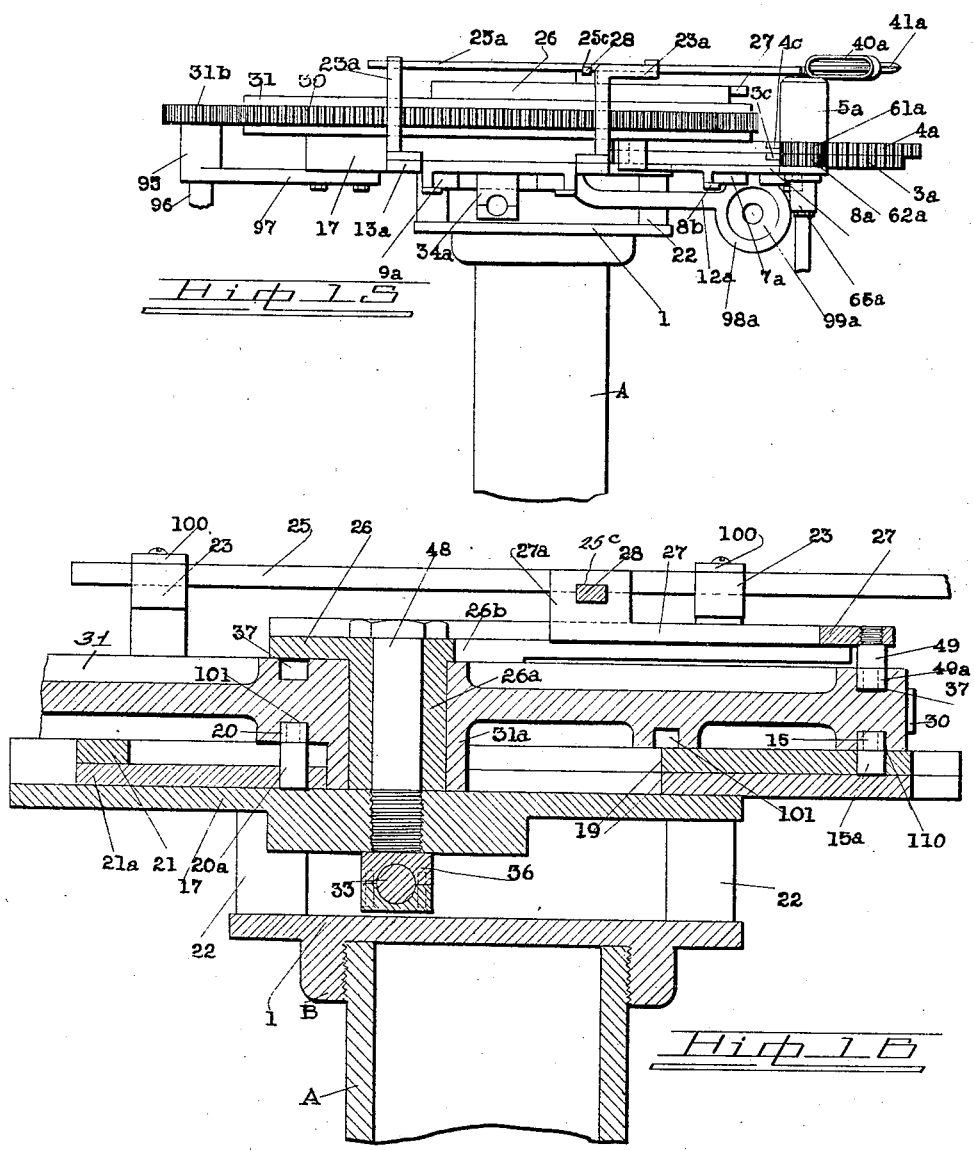

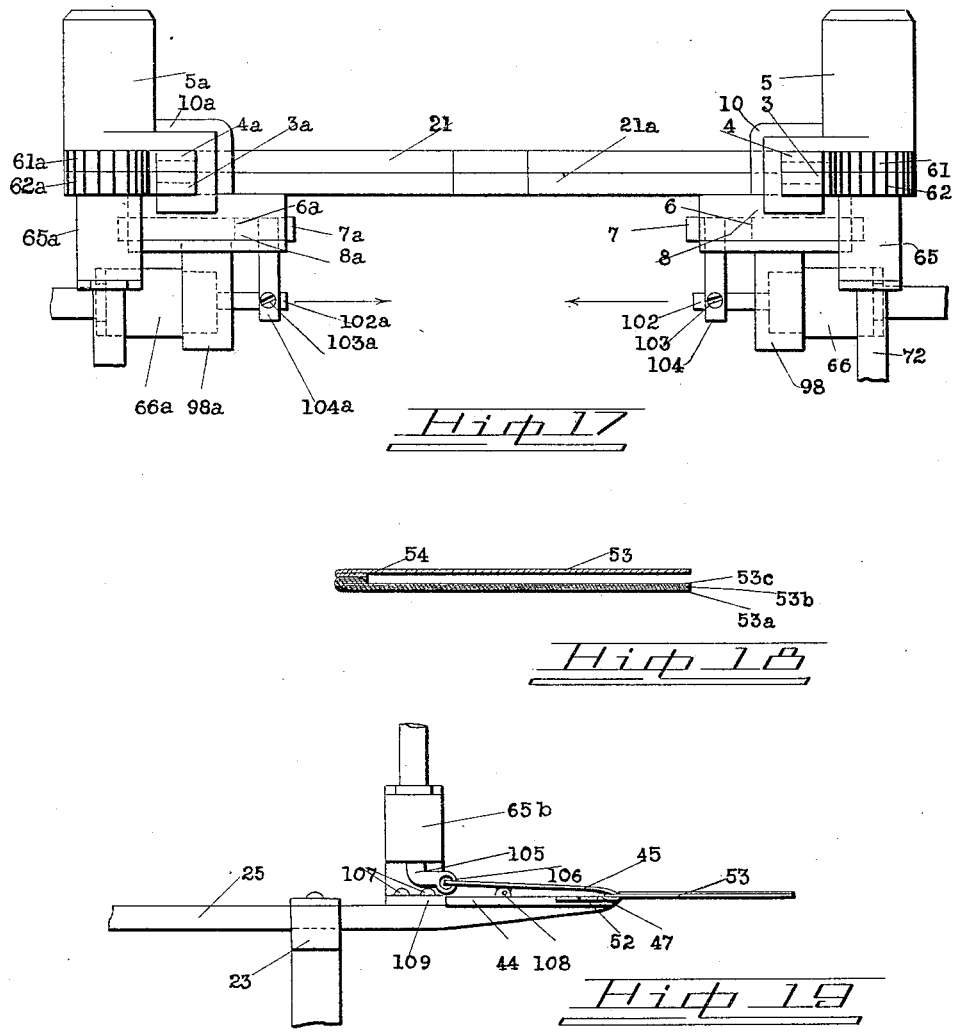

UNITED STATES PATENT OFFICE.

OMAR A. WHEELER, OF PORTLAND, OREGON.

MECHANISM FOR TURNING CUFF-PLIES AND THE LIKE.

1,050,074.   Specification of Letters Patent.   Patented Jan. 7, 1913.

Application filed July 19, 1911. Serial No. 639,388.

*To all whom it may concern:*

Be it known that I, OMAR A. WHEELER, a citizen of the United States, residing at Portland, in the county of Multnomah and State of Oregon, have invented certain new and useful Improvements in Mechanism for Turning Cuff-Plies and the Like, of which the following is a specification.

This invention relates to improvements in mechanism for turning cuff plies, and the like, and has for its object to produce a machine which will fold flex and pass the sewed edges of a plurality of layers of fabric which are unsewed at one or more edges, through an open side, between the cover plies, thereby turning the article.

A further object is to produce a machine which will hold the several plies of a cuff or other blank, after having been sewed across its front edge and its ends with the faces of the covering inward, then to automatically turn the blank leaving the faces outward, press the plies neatly up to the seam at each side, and finally to discharge the article.

A preferred form of the invention is illustrated in the accompanying drawings, in which—

Figure 1:
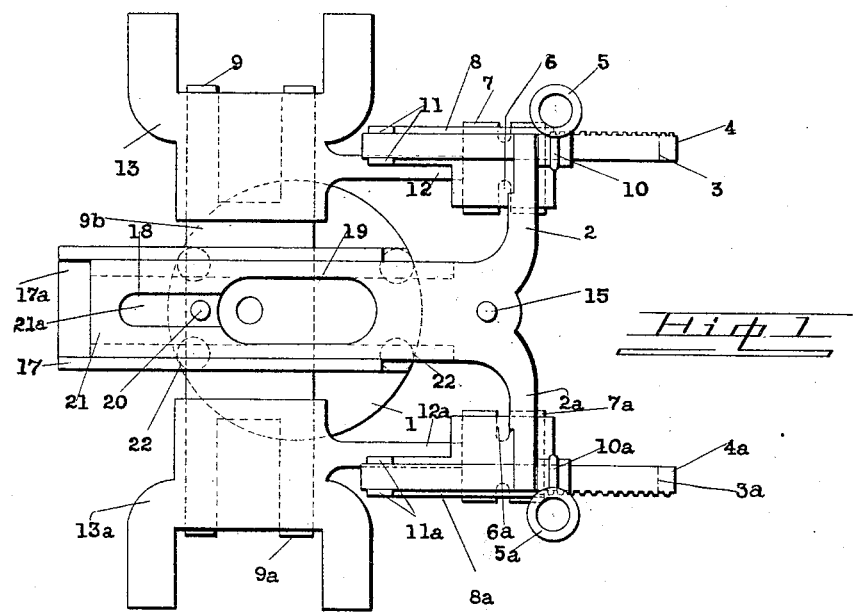
Figure 2:
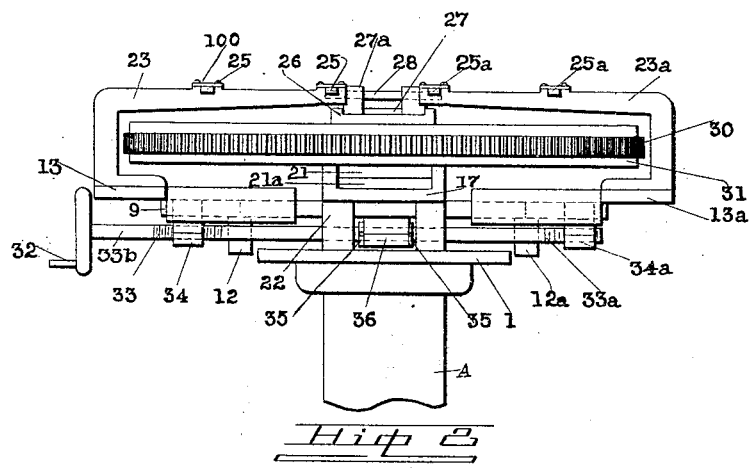
Figure 2:
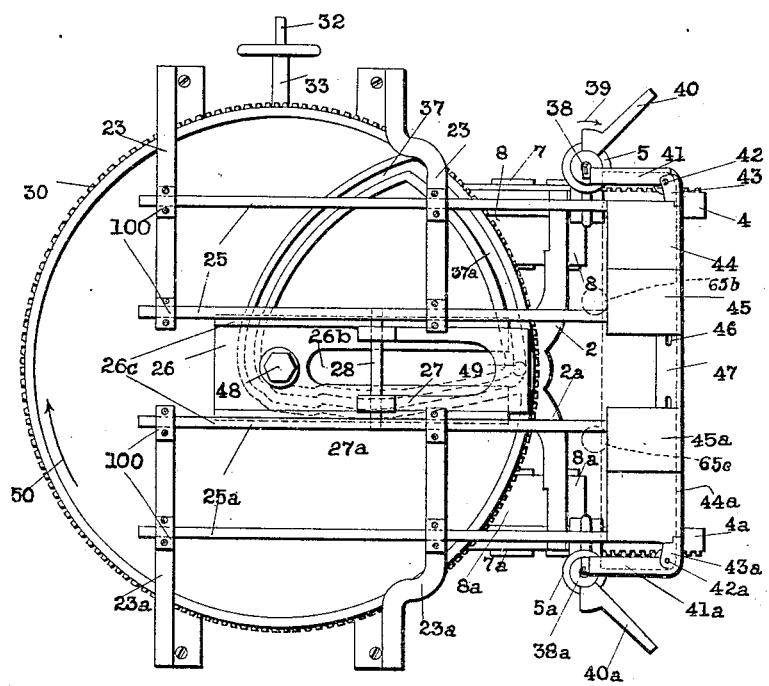

Figure 1 is a plan view of the machine with the upper parts removed. Fig. 2 is a rear elevation of the machine. Fig. 3 is a top view of the entire machine, showing the follower at its forward limit. Fig. 4 is a detail top view of the front portion of the machine, with a cuff in position to begin the turning operation. Fig. 5 shows the unsewed edges of the cuff. Fig. 6 shows the cuff partially turned. Fig. 7 is a detail top view of the turner and turner clamp. Fig. 8 is a side elevation of same. Fig. 9 is a transverse sectional elevation of Fig. 8. Fig. 10 is a sectional elevation of a compressed air cylinder. Fig. 11 is an elevation of a device for admitting and releasing the air entering the cylinders. Fig. 12 is a top view of same. Fig. 13 is a sectional plan view of same. Fig. 14 is a sectional elevation of Fig. 11. Fig. 15 is a side elevation of the machine. Fig. 16 is a longitudinal sectional elevation. Fig. 17 is a detail elevation of the tension releasing mechanism. Fig. 18 is a transverse sectional view of a cuff, after having been turned. Fig. 19 is a detail elevation of the follower clamp.

In each of the several views similar parts are designated by similar reference characters.

In the drawing A is a pedestal or support to which is secured the flange B, upon which is mounted the base 1 of the machine. Upon the upper surface of the base are mounted vertical posts 22, supporting lengthwise thereon the guide-plate 17 which is provided in its upper face with a longitudinal groove $17^a$, to receive the sliding plates 21 and $21^a$. Transversely between said posts, and covering approximately the rear half of plate 1, is fixed a plate $9^b$ having terminal arms 9 at the one end and $9^a$ at the other. Upon the arms 9 is secured the sliding support or bracket 13 having the forwardly projecting arm 12. A similar support $13^a$ is in like manner secured upon the arms $9^a$, and upon it is formed the arm $12^a$. The said arms 12 and $12^a$ terminate in the air cylinder supports 98 and $98^a$ respectively, which are provided with seats 99 and $99^a$.

The plates 21 and $21^a$ have formed at their intermediate portions an oblong aperture 19, that in the plate 21 being extended rearwardly as at 18. The opening 19 is made to receive the hub $31^a$ of the cam-wheel 31, which is secured to the plate 17 by means of a stud $26^a$ held in place by the cap screw 48 bearing against the head 26. In the lower face of said cam wheel 31, is formed a continuous cam groove 101. A pin $20^a$ having secured theron a roller 20, is fixed in the sliding plate $21^a$ and is made to engage in said cam groove whereby when the wheel is revolved the plate $21^a$ will be caused to reciprocate. Outside of said groove 101 is formed a similar cam-groove 110, adapted to receive the pin $15^a$ carrying roller 15, mounted in the sliding plate 21. By the revolution of the wheel 31 the plate 21 will be caused to reciprocate. In the upper face of said wheel 31 also is formed a cam groove 37, in which engages the pin 49 carrying the roller $49^a$, which pin is fixed in sliding plate 27. This plate moves between the upwardly projecting flanges $26^c$ of the stud-head 26, and is operated by the revolution of wheel 31, which is driven by the pinion $31^b$ meshing with the teeth 30. Upon the forward end of the sliding plates 21 and $21^a$ are formed the laterally extending arms 2 and $2^a$, for a purpose to be later described.

Upon the cylinder supports 98 and $98^a$ are rigidly secured the plates 7 and $7^a$, upon which move the sliding bases 8 and 8ᵃ which bases are held on said plates by suitable lugs and gibs 8ᵇ. Mounted upon the bases 8 and 8ᵃ are the vertical boxes 5 and 5ᵃ respectively, held by means of the brackets 10 and 10ᵃ, at the inner side. Within said brackets are mounted the reciprocating racks 3 and 4, and 3ᵃ and 4ᵃ respectively, which are thereby held in a horizontal plane and are mounted to reciprocate longitudinally. In the upper face of each rack is formed a transverse groove as shown at 3ᶜ and 4ᶜ, Fig. 15, to receive the lateral arms 2 and 2ᵃ of sliding plates 21 and 21ᵃ, whereby, when said plates 21 and 21ᵃ are reciprocated the corresponding racks will be caused to reciprocate in a similar manner. Guide-lugs 11 and 11ᵃ sustain said racks in position. Within said boxes 5 and 5ᵃ are concentrically mounted the tubular spindles, as shown at 56 and 60, in Fig. 9. The outer spindle 60 has secured at its lower end pinion 61 meshing with rack 4; and the inner spindle 56, which extends below the former, has secured adjacent pinion 61 another pinion 62, which meshes with rack 3. To the lower end of spindle 56 is secured an air piston cylinder or ram 65. It will be understood that similar structure is contained in both boxes and that the two operate simultaneously. To the lower ends of cylinders 65 are attached connecting pipes 72, by means of coupling 71.

51 is a piston rod carrying the piston head 68, upon which rod is secured the push spring 64 bearing against the washer 63, whereby the piston is held normally in the downward position, as seen in Fig. 10. To the upper end of the piston rod which is mounted in the aperture 57 of the spindle 56, is pivotally secured the arm 38, by means of pin 59, which is likewise secured at the other end to the jaw or plate 41ᵇ of the clamp, upon pin 58. The upper member 41 of the clamp is rigidly fixed upon the outer end of arm 38 and when that arm is operated on its pivots by the piston rod it will cause the upper member of the clamp to open and close. It will be seen in Fig. 9 that the pivot 58 is mounted in the lower jaw 41ᵇ, which is formed integrally on the upper end of spindle 56, and with which it revolves. The turner 40 is in like manner fixed on the upper end of spindle 60 and revolves with it, the said clamp passing through the opening thereof. To the outer end of the lower member of each of said clamps is pivoted at 42 and 42ᵃ the swinging member 43 and 43ᵃ respectively, the purpose of which will be described later.

Upon the brackets 13 and 13ᵃ are secured two pairs of arms 23 and 23ᵃ, which rise above the cam wheel 31 and extend inwardly toward the middle point as seen in Figs. 2 and 3. At the inner end of each pair and at an intermediate point thereof is mounted a sliding bar 25 and 25ᵃ respectively, which extends longitudinally toward the forward portion of the machine, and in the same plane with the swinging clamps, and they are held in place by caps 100. To the forward ends of the bars 25 is rigidly secured a sheet metal or other suitable plate 44; and in like manner is secured the plate 44ᵃ to the ends of bars 25ᵃ. These two plates are mounted transversely of the bars and their front edges made continuous by the link 47, which is mounted on pins 52 and 52ᵃ in the slots 46 and 46ᵃ.

Sliding between the flanges 26ᶜ is a U-shaped member 27, which has the ends of its arms united by a bar 28 rigidly fixed at a height which will permit it to clear the cap screw 48. The ends of the bar 28 extend through suitable notches 25ᶜ formed in the lower faces of the inner bars 25 and 25ᵃ, which permits the latter to be adjusted laterally and at the same time will carry said bars longitudinally as the member 27 is reciprocated. In the forward end of member 27 is secured a depending stud 49, having thereon a roller 49ᵃ which engages in the cam-groove 37, whereby, when the wheel is revolved the member 27 and the parts mounted thereon will be reciprocated. Upon the upper surface of plate 44 is pivotally secured a plate 45; and similarly upon plate 44ᵃ is secured the plate 45ᵃ. In this manner there is formed a pair of clamps which grasp and hold taut the sewed edge of the cuff.

Fig. 19 shows an arm 23 on which is carried the bar 25, supporting the plate 44 at its end. To the rear of plates 45 and 45ᵃ on said bars are mounted the cylinders 65ᵇ and 65ᶜ, by means of brackets 109 and screws 107. To the piston of said cylinder is pivotally secured at 106, the rear edge of the upper member 45 of the clamp, the said upper member being pivoted at an intermediate point 108, to the plate 44, where by the operation of said piston the member 45 is raised and lowered, thereby opening and closing the clamp.

To plates 8 and 8ᵃ are rigidly secured the studs 104 and 104ᵃ which depend through slots 6 and 6ᵃ in plates 7 and 7ᵃ, to the lower end of which studs are secured by means of screws 103 and 103ᵃ the piston rods 102 and 102ᵃ of the cylinders 66 and 66ᵃ. As shown in Fig. 10 the piston in each cylinder is normally held against the bottom by push spring 64. When air is forced beneath the pistons through the inlet 72, against the spring 64, it pushes the rod 51 forwardly carrying the stud 104 and base 8 attached thereto, inwardly; and when the air is released the springs will cause the pistons to return, carrying the said bases 8 and 8ᵃ, together with the racks and spindles, to their outward position. It will be noted that the structure and operation of the air rams 65 and 65$^a$ and 66 and 66$^a$ are similar.

To the plate 1 is secured by means of bolt 73, a bracket 74 extending to a point beyond the periphery of wheel 31, said bracket having an aperture 75 to conduct the air from tube 88 through the valve case 82. Upon said bracket 74 is mounted another bracket 76 carrying the three vertical spindles 79, upon the upper ends of two of which are fixed wheels 78—78$^b$ engaging studs 85 and 85$^b$ in the lower flange of wheel 31; and upon the other is fixed a similar wheel 80 engaging similar studs on the upper flange of said wheel 31. Fixed upon each of the spindles 79, in the valve casing 82 is a rotating hollow valve 87 provided with four apertures 86, equally spaced about its circumference. The open bottom of each valve communicates with opening 92 of the bottom plate 83 of the casing, leading to outlet tube 84 secured thereto by screws 91. Each outlet tube leads to one of said air-rams. The aperture 75 leads to air passage 89 which communicates with apertures 90 etc. leading to the valves. In the opposite side of the valve casing from each inlet opening is an outlet aperture, formed in the same horizontal plane, and at an angle of 45 degrees from a line passing through the center of aperture 90 and the center of the valve. The studs are spaced on the flanges of wheel 31 so as to operate the wheels 78 80 at the desired moment. Each wheel in this case, is provided with twice the number of prongs as there are ports in the valve attached thereto, so that each prong of a wheel turns its valve one-eighth of a revolution thereby causing valve ports 86 to register with the inlet port of the valve casing, and then with the outlet port, alternately.

When articles of different lengths are used it is necessary to adjust the brackets 13 and 13$^a$ and the mechanism carried thereby, laterally upon the arms 9 and 9$^a$. To accomplish this adjustment lugs 34 and 34$^a$ are made to depend from said brackets 13 and 13$^a$ and are provided with left hand and right hand internal screw threads respectively adapted to engage the corresponding screw threads 33 and 33$^a$ of the screw 33$^b$, which is operated by hand wheel 32. Said screw also passes through lug 36 depending from plate 17, and the rigidly secured collars 35 bear against said lug to prevent longitudinal movement of the screw.

In the operation of the machine, the cuff blank containing the upper and lower coverings 53 and 53$^a$ respectively and the inner plies 53$^b$, is placed within the clamps, which grip it at the sewed edge 54, as seen in Fig. 4. The cam wheel 31 is set into operation by the pinion 31$^b$, mounted on shaft 96 secured in the bearing 95 of the bracket 97, which is attached to the plate 17. The blank will be loaded or placed in the clamps when the parts are in retracted position and the clamps all open. In this position the ports 90$^b$ and 90$^c$ will be open, with their corresponding outlet ports closed. The springs acting on their pistons in cylinders 65 and 65$^a$ and in 65$^b$ and 65$^c$ will be in compressed position. Lugs 85$^b$ and 85$^c$ on wheel 31, which are so spaced as to strike wheels 78$^b$ and 80 at this instant, turn their corresponding valves a one-eighth revolution releasing the air and permitting the springs to close the clamps. Lugs 85 are so spaced as to turn wheel 78 immediately after the setting of said clamps. Up to this instant the port 90 had been closed and the outlet port 93 open, so that the pressure of air was released, and the springs 64 then forced the pistons and the plates 8 and 8$^a$ with parts attached thereto to their outward limit. The succeeding turn of the wheel 78 causes the port 90 to open and the outlet port 93 to close, when the air forces the pistons to their inward limits carrying the end clamps and attached parts inwardly, relaxing the material of the cuff. At this instant the cam groove 37 bearing on the pin or stud 49, causes the plate 27 with the follower clamps 45 and 45$^a$ to recede so as to clear the turning loops. This movement at the same time takes up a part of the slack in the fabric and reduces the amount of flexure necessary in turning.

Before completion of the above described movements the cam groove 110 will have moved the pin 15$^a$ causing the plate 21$^a$ to recede and the arms 2 and 2$^a$ to retract the racks 4 and 4$^a$, thereby setting into operation the spindles 60 and 60$^a$ carrying the loops 40 and 40$^a$, which normally stand at their outward limit, in the direction indicated by the arrows 39, to within approximately 5½ degrees of their corresponding swinging clamps, entering between the cover plies of the cuff. At this point the cam groove 101 will move the stud 20$^a$, causing the plate 21$^a$ to advance, and the arms 2 and 2$^a$ thereof will carry with them the racks 3 and 3$^a$ thereby rotating the spindles 56 and 56$^a$ carrying the clamps 41 and 41$^a$ toward their respective loops, within which they enter, carrying the sewed and clamped edges of the blank therethrough thus bringing the faces of the cuff to the outside, as indicated in Fig. 6. Immediately after the clamps pass through their respective loops, the loops will begin to recede at approximately one-half the rate of that of the clamps, so that when the clamps have reached an angle of 90 degrees from the starting point, the loops will stand behind the clamps at an angle of approximately 45 degrees. From this point, the loops will move at approximately twice the rate of the clamps, so that the two will reach their outward limit at the same instant.

Simultaneously with the above described movements the follower moves forward at a rate of speed that will hold the fabric approximately taut. The swinging members 43 and 43ª pivoted to the lower jaws of the swinging clamps, will be engaged by the follower toward the forward limit of their movement and forced into line, thereby making a continuous metal support the entire length of the seam of the cuff. These swinging members together with the ends of the lower jaws of the clamps may be rounded or square at the corners 41ᶜ, so also may the front edge of the follower be of irregular shape, or as required by the shape of the article turned. Just before the follower clamp reaches the position of the spindles in its forward movement, the wheel 78 will be turned by a lug 85 and the port 90 will be closed and port 93 will be opened. The springs in the cylinders 66 and 66ª will expand pushing the spindles out to their original position, permitting the follower to pass between them, and also stretching the article tight at the end of the turning operation. When these parts reach their outward limits the stud 49 will be entering the portion 37ª of the groove 37, which portion is made to conform with the periphery of wheel 31. A similar construction is made in the grooves 101 and 110 in which their corresponding studs will enter at the same time. By reason of this trend of the grooves the parts will remain stationary for approximately a quarter of a revolution of the cam wheel, during which time the article may be "set." The wheel 80 will then be turned by a lug 85ᶜ opening the port 90ᶜ and closing port 93ᶜ, when the air will cause the pistons in the cylinders 65ᵇ and 65ᶜ to compress their springs and the clamps 45 and 45ª to open. At this point the stud 49 will emerge from the portion 37ª of the groove and the follower will be retracted to a point beyond the spindles. By a repetition of the preceding operations the spindles will be carried to their inner positions, so as to relax the fabric and permit the swinging clamps to open, which movement will immediately take place as follows: Wheel 78ᵇ will be turned by a lug 85ᵇ causing port 90ᵇ to open and port 93ᵇ to close, compressing the springs in cylinders 65 and 65ª, and thereby opening the jaws 41 and 41ª, when the article may be removed. Since the end clamps hold the entire end of the blank, it will be apparent that the sewing need not extend entirely across the end; but the end may be left partially open, if desired, to suit the needs to which the blank is applied.

The operation of the invention and the advantages arising from mechanically turning the blanks for assembling them with other articles will be obvious to operators, and further explanation appears unnecessary, but I wish it understood that I do not limit myself to the precise details of construction and arrangement of devices shown, as they may be varied and rearranged according to judgment and circumstances without departing from the principles or sacrificing the advantages of my invention.

What I claim as new and desire to secure by Letters Patent, is—

1. In a machine for turning articles composed of a plurality of plies which are open at one edge, a base, a plurality of clamps for engaging the article mounted thereon, turning loops adapted to pass within the open edge of the plies and to flex them backwardly over said clamps and actuating means for swinging said clamps through said loops.

2. In a mechanism of the character described, a base, oppositely disposed spindles mounted thereon, a clamp mounted on each spindle to swing in a horizontal plane, a turning-loop mounted concentrically with the mounting of each clamp and adapted to encompass the clamp, and means actuated by the machine for rotating said spindles thereby causing the clamps to swing through their corresponding loops.

3. In a mechanism of the character described, a base, a pair of spindles mounted at one side thereof, a clamp mounted at the top of each spindle to swing in a horizontal plane, a clamp mounted on the base to reciprocate longitudinally in the plane with said swinging clamps, a turning-loop mounted concentrically with the mounting of each swinging clamp, each loop encompassing its corresponding clamp, and means actuated by the machine for simultaneously operating said clamps and turning-loops.

4. In a mechanism of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically with the mounting of each swinging clamp, each loop encompassing its corresponding clamp, and means for simultaneously operating said clamps and said loops with varying rates of speed.

5. In a mechanism of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically with the mounting of each swinging clamp, each loop encompassing its corresponding clamp, means for operating said loops and said swinging clamps in opposite directions, and means for bringing the reciprocating clamp and the swinging clamps to the limit of their movements at the same instant.

6. In a mechanism of the character described, a base, a pair of vertical spindles mounted to oscillate at one side thereof, a clamp fixed at right angles to the top of each spindle, a tubular spindle mounted concentrically of each of the first mentioned spindles, a turning loop adapted to encompass its corresponding clamp fixed at right angles to the top of each tubular spindle, and means mounted on said base for operating said spindles.

7. In a mechanism of the character described, a base, a drive wheel mounted thereon, a pair of vertical spindles mounted to oscillate at one side of said base, a clamp fixed at right angles to the top of each spindle, a tubular spindle mounted concentrically of each of the first mentioned spindles, a turning loop adapted to encompass its corresponding clamp fixed at right angles to the top of each tubular spindle, and means connecting said drive wheel with said spindles for swinging said clamps and turning loops.

8. In a mechanism of the character described, a base, a pair of vertical spindles mounted to oscillate at one side thereof, a clamp fixed at right angles to the top of each spindle, a tubular spindle mounted concentrically of each of the first mentioned spindles, a turning loop adapted to encompass its corresponding clamp fixed at right angles to the top of each tubular spindle, a pinion fixed upon each of said spindles, a rack mounted on said base meshing with each of said pinions, and means upon the base for operating the racks.

9. In a mechanism of the character described, a base, a bracket adjustably secured at each side thereof, a retaining clamp mounted to oscillate upon each of said brackets, a turning loop mounted to oscillate upon each bracket and adapted to encompass its corresponding clamp, and actuating means upon said base for simultaneously operating said clamps and loops.

10. In a mechanism of the character described, a base, a bracket adjustably secured at each side thereof, means for adjusting the brackets, a retaining clamp mounted to oscillate upon each of said brackets, a turning loop mounted to oscillate upon each bracket and adapted to encompass its corresponding clamp, actuating means upon said base for simultaneously swinging said clamps and loops, and means for automatically opening and closing the clamps.

11. In a mechanism of the character described, a base, a pair of vertical spindles mounted to oscillate at the front side thereof, a clamp fixed at right angles to the top of each spindle, a tubular spindle mounted concentrically of each of the first mentioned spindles, a turning loop adapted to encompass its corresponding clamp fixed at right angles to the top of each tubular spindle, plates mounted to reciprocate on said base, means operatively connecting said plates with said spindles, and means upon the base for reciprocating said plates whereby the spindles are operated.

12. In a machine for turning articles composed of a plurality of plies which are secured together at one or more edges, a base, means for securing the articles upon said base, turning loops adapted to pass within an open edge of the plies of the article and to separate them and flex them backwardly over said securing means, and means for oscillating said loops.

13. In a mechanism of the character described, a base, a pair of vertical spindles mounted to oscillate at the front side thereof, a clamp fixed at right-angles to the top of each spindle, a tubular spindle mounted concentrically of each of the first mentioned spindles, a turning loop adapted to encompass its corresponding clamp fixed at right angles to the top of each tubular spindle, plates mounted to reciprocate on said base, means operatively connecting said plates with said spindles, and means upon the base for reciprocating said plates independently of each other, whereby the spindles may be simultaneously operated in different directions and with varying rates of speed.

14. In a mechanism of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically with the mounting of each swinging clamp, means for operating said loops and said swinging clamps independently of each other, means for bringing the clamps to the limit of their movement at the same instant, and means secured upon the end of each swinging clamp for shaping the corners of the article turned.

15. In a mechanism of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically of the mounting of each swinging clamp, means for operating said loops and said swinging clamps independently of each other, means for bringing the clamps to the limit of their movement at the same instant, and means secured upon the end of each swinging clamp adapted to engage the reciprocating clamp at its outward limit, whereby a continuous end-and-side form is obtained for shaping the article turned.

16. In a machine of the character described, a base, oppositely disposed spindles mounted thereon, a clamp mounted on each spindle to swing in a horizontal plane, a turning loop mounted concentrically with the mounting of each clamp and adapted to encompass the clamp, a reciprocating bar operatively connected with each of said spindles, and a cam-gear operatively connected with said bars for operating said clamps and loops.

17. In a machine of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically with the mounting of each swinging clamp, a reciprocating bar operatively engaging each of said spindles, and a cam-gear operatively connected with each bar whereby each spindle is independently operated.

18. In a machine of the character described, a base, a pair of spindles mounted at one side thereof, a clamp mounted at the top of each spindle to swing in a horizontal plane, a turning loop mounted concentrically with the mounting of each swinging clamp, a reciprocating bar operatively connected with each of said spindles, a drive-wheel having irregular cam-grooves formed in the face thereof mounted on said base, and a member connected with each of said bars and having a bearing in a groove of said drive-wheel whereby each spindle may be intermittently set into motion with varying rates of speed.

19. In a machine of the character described, a base, a pair of spindles mounted at one side thereof, a clamp fixed at the top of each spindle and oscillating therewith, a turning loop mounted concentrically with the mounting of each spindle and adapted to encompass its corresponding clamp, a reciprocating bar operatively connected with each spindle, a drive-wheel having a plurality of cam-grooves formed in its face, a portion of each of which conforms to the periphery thereof, mounted on said base, a plate connected to each pair of bars and having a bearing in one of said grooves, and means for actuating said drive-wheel, whereby the spindles will be intermittently set into motion.

20. In a machine of the character described, a base, a pair of vertical spindles mounted to oscillate at one side thereof, a clamp fixed at right angles to the top of each spindle, a tubular spindle mounted concentrically of each of the first mentioned spindles, a turning loop adapted to encompass its corresponding clamp fixed to the top of each tubular spindle, means mounted on the base for operating the spindles, an air ram for controlling said clamps, and means for controlling the air in said rams.

21. In a machine of the character described, a base, a drive-wheel mounted thereon, a pair of vertical spindles mounted to oscillate at one side of said base, a clamp fixed at right angles to the top of each spindle, a tubular spindle mounted concentrically of each vertical spindle, a turning loop adapted to encompass its corresponding clamp fixed to the top of each tubular spindle, means for connecting said drive wheel with said spindles for swinging said clamps and turning loops, and means for automatically opening and closing said clamps.

22. In a machine of the character described, a base, a pair of spindles mounted at one side thereof, a clamp mounted at the top of each spindle to swing in a horizontal plane, a clamp mounted on the base to reciprocate longitudinally in the plane with said swinging clamps, a turning loop mounted concentrically with the mounting of each swinging clamp, means for operating said loops and said swinging clamps independently of each other, an air ram mounted on said base for controlling each of said clamps, and means for admitting the air to and releasing it from said rams.

23. In a machine for turning cuffs and similar articles composed of a plurality of plies, a base, a bracket adjustably secured at each side thereof, means upon each bracket for engaging the cuff, means for separating the plies for folding and flexing them back upon themselves, and means for expanding and retracting said brackets, whereby the tension of the article may be controlled.

24. In a machine of the character described, a base, a drive-wheel mounted thereon, a pair of supports fixed at one side of the base, a vertical spindle adjustably mounted to oscillate upon each support, a clamp fixed at right angles to the top of each spindle, a tubular spindle mounted concentrically of each of the first mentioned spindles, a turning loop adapted to encompass its corresponding clamp fixed to the top of each tubular spindle, an air ram fixed upon each of said supports and operatively connected with its corresponding spindle, and means on said drive-wheel for admitting the air to and releasing it from said rams, whereby said spindles are caused to oscillate.

25. A machine for turning articles composed of a plurality of plies secured together with one or more edges open, comprising a base, a pair of swinging clamps for engaging the article adjustably mounted thereon, turning loops adapted to pass within the open edge of the plies and to flex them backwardly over said clamps, means for swinging said clamps through said loops, and means for expanding and retracting the clamps to suit the size of article turned.

26. A machine for turning articles composed of a plurality of plies secured together with one or more edges open, comprising a base, a transverse support thereon, a bracket slidably secured at each end of said support, an arm extending forwardly from each bracket, a swinging clamp adapted to engage the article mounted at the end of each arm, a swinging loop adapted to pass within the open edge of the plies and to flex them backwardly over said clamps, means for swinging said clamps through said loops, and means for expanding and retracting said brackets whereby the clamps and loops are adjusted to the size of the article turned.

27. A machine for turning articles composed of a plurality of plies secured together with one or more edges open, comprising a base, a pair of swinging clamps for engaging the article mounted at one side thereof, turning loops adapted to pass within an open edge of the plies and to flex them backwardly over said clamps, a follower mounted to reciprocate on said base and adapted to follow the sewed edge of the plies to its limit in the turning movement and to retreat, and means on the machine for actuating said members.

28. A machine for turning articles composed of a plurality of plies secured together with one or more edges open, comprising a base, a pair of swinging clamps for engaging the article mounted at one side thereof, turning loops adapted to pass within an open edge of the plies and to flex them backwardly over the clamps, a follower mounted to reciprocate in the same plane as the clamps and adapted to follow the sewed edge of the article to its forward limit thereby establishing a continuous form for the article, and means actuated by the machine for operating said elements.

29. A machine for turning articles composed of a plurality of plies secured together with one or more edges open, comprising a base, a pair of swinging clamps for engaging the article mounted at one side thereof, turning loops adapted to pass within the open edge of the plies and to flex them backwardly over the clamps, a follower comprising two laterally adjustable members mounted to reciprocate in the same plane as the clamps, a sliding link uniting the front edges of said members, means for bringing said clamps and follower to their forward limit at the same instant producing a continuous form for the article, and means for expanding and contracting the members of the follower.

30. A machine for turning articles composed of a plurality of plies secured together with one or more edges open, comprising a base, a drive wheel having a plurality of irregular continuous grooves formed in its faces mounted thereon, a pair of spindles mounted to oscillate at one side of said wheel, a retaining member fixed at the top of each spindle, a tubular spindle mounted concentrically of each of the first mentioned spindles, a turning member formed thereon, a bar operatively connected with each spindle and mounted to reciprocate on said base, a plate connected with each pair of bars and mounted to reciprocate adjacent the face of the wheel, and a stud fixed in each plate and bearing in a groove of the wheel, whereby the spindles are oscillated for operating the retaining and turning members.

31. A machine for turning articles composed of a plurality of plies secured together with one or more edges open, comprising a base, a drive wheel having a plurality of irregular continuous grooves formed in its faces mounted thereon, a pair of spindles mounted to oscillate at one side of said wheel, a retaining member fixed at the top of each spindle, a tubular spindle mounted concentrically of each of the first mentioned spindles, a turning member formed at the top thereof, a bar operatively connected with each spindle and mounted to reciprocate on said base, a plate connecting each pair of bars and mounted to reciprocate adjacent a face of the wheel, a follower mounted in the plane with said retaining members, a plate connected therewith and mounted to reciprocate adjacent a face of the wheel, and a stud fixed in each of said reciprocating plates and bearing in a groove of the wheel, whereby said spindles and said follower are operated.

In testimony whereof I affix my signature in presence of two witnesses.

OMAR A. WHEELER.

Witnesses:
 EDWIN E. HECKBERT,
 A. J. MATTER.

Copies of this patent may be obtained for five cents each, by addressing the "Commissioner of Patents, Washington, D. C."